United States Patent [19]

Weiss et al.

[11] 4,390,679

[45] Jun. 28, 1983

[54] LATENT URETHANE RESIN SYSTEMS

[75] Inventors: Jonas Weiss, Port Chester; Raymond Seltzer, New City, both of N.Y.

[73] Assignee: Ciba-Geigy Corporation, Ardsley, N.Y.

[21] Appl. No.: 331,858

[22] Filed: Dec. 17, 1981

[51] Int. Cl.³ .............................................. C08G 18/32
[52] U.S. Cl. ..................................... 528/64; 525/459; 528/904; 528/906
[58] Field of Search .......................... 528/64; 525/459

[56] References Cited

U.S. PATENT DOCUMENTS

| | | | |
|---|---|---|---|
| 3,261,882 | 7/1966 | Gorton | 525/423 |
| 3,488,742 | 1/1970 | Blekicki | 525/423 |
| 3,639,657 | 2/1972 | Moran et al. | 525/423 |
| 3,759,914 | 9/1973 | Simms et al. | 525/423 |
| 3,886,228 | 5/1975 | Bolger | 525/423 |
| 3,963,680 | 6/1976 | O'Keefe et al. | 528/64 |
| 4,182,898 | 1/1980 | Fujiwara et al. | 528/64 |
| 4,212,916 | 7/1980 | Tanaka et al. | 528/64 |

*Primary Examiner*—H. S. Cockeram
*Attorney, Agent, or Firm*—Harry Falber

[57] ABSTRACT

Urethane resins containing, as latent hardeners, the reaction products of an acid anhydride or imide, such as phthalic anhydride, and an aromatic or cycloaliphatic polyamine, said resin systems being stable for long periods when stored at ambient or moderately elevated temperatures while providing on curing for relatively short periods at elevated temperatures, on the order of 100°–150° C., hardened products of good properties.

13 Claims, No Drawings

LATENT URETHANE RESIN SYSTEMS

Amines in general and aliphatic amines in particular are well known to react rapidly with polyisocyanates including isocyanate-terminated prepolymers to bring about curing by cross-linking even at room temperature. Because of the rapidity of reaction, it has generally been necessary to mix the amine with the polyisocyanate shortly before use in order to avoid premature curing; this necessitates shipping and storing such materials as two components in two separate packages or containers.

However, in many instances it is desirable in applications to provide a urethane composition which is readily curable but which has sufficient shelf stability to permit admixture prior to use. It is, therefore, essential that the components, that is, the urethane resin and the curing agent, be able to coexist for reasonable periods after admixture. As noted, many of the known curing agents which would provide effective and rapid curing at elevated temperatures are unsatisfactory since they fail to meet this requirement and tend to initiate gelation when incorporated into the urethane resin.

To provide a solution to this problem, considerable effort has been expended on the development of latent curing agents, that is curing agents which will be unreactive with resins at about room temperature but which will react rapidly therewith at elevated temperatures. The availability of such latent curing agents permits the preparation of urethane resin compositions which will have a long shelf life, coupled with the capacity for rapid curing on heating.

A variety of such latent curing agents have been disclosed in the art. Amines, amine derivatives or substituted amines are frequently mentioned as suitable for this use. A number of these latent curing agents are listed in U.S. Pat. No. 3,759,914. Latent curing agents prepared from acid anydrides and linear aliphatic polyamines are disclosed, for example, in U.S. Pat. No. 3,261,882, U.S. Pat. No. 3,488,742 and U.S. Pat. No. 3,639,657. Emphasis is placed on reaction products of phthalic anhydride and diethylenetriamine in these disclosures. These latent curing agents are specified for use with a broad range of epoxy resins. U.S. Pat. No. 3,886,228 discloses similar latent curing agents prepared from diethylenetriamine or triethylenetetramine with a carboxylic anhydride for use in polyurethane resins.

It is the object of this invention to provide higher performance, one-component urethane resin systems containing a novel class of latent curing agents.

Various other objects and advantages of this invention will be readily apparent from the following detailed description thereof.

In accordance with the present invention, it has been found that the reaction products of certain anhydrides or imides with certain aromatic or cycloaliphatic amines are latent hardeners of desirable characteristics which, when combined with urethane resins, will provide compositions stable for long periods of time when stored at ambient temperatures or at moderately elevated temperatures while still providing, on curing for relatively short periods at elevated temperatures, for example, for 10–60 minutes at 100°–150° C., hardened products of exceptional properties. Although the resulting materials contain free amino groups, they are apparently unreactive because of incompatibility with urethane resins. Heating solubilizes the material, allowing curing to occur. It is particularly notable that the properties obtained on curing combinations of urethane resins and the instant latent hardeners, which have been stored for periods of a month or longer, are of the same order as the properties obtained on curing freshly prepared combinations or urethane resin and latent hardener.

Of special importance, the instant urethane systems exhibit improved performance characteristics over the prior art systems utilizing latent hardeners prepared from the linear aliphatic polyamines. These improvements in the cured polyurethane resins are particularly noted in long term stability and in temperature and humidity resistance. Accordingly, the resin systems may be used in a broad range of end use applications, and particularly in the field repair of urethane parts of fiber-reinforced plastic parts. Such end use applications are particularly characterized by situations where neither accurate mixing equipment nor high temperature heating equipment are available.

The anhydrides which are employed as reactants in the preparation of the latent hardeners are aliphatic, cycloaliphatic and aromatic carboxylic acid anhydrides such as phthalic anhydride, hexahydrophthalic anhydride, tetrahydrophthalic anhydride, methyltetrahydrophthalic anhydride, dodecylsuccinic anhydride, maleic anhydride and succinic anhydride. Correspondingly, aliphatic, cycloaliphatic and aromatic imides are applicable for use herein. Phthalic anhydride and phthalimide are preferred.

The polyamines applicable for use herein are unsubstituted or lower alkyl-substituted aromatic, araliphatic or cycloaliphatic polyamines. Phenyl is the preferred aromatic group while six carbon atom rings, and preferably cyclohexyl, are the preferred cycloaliphatic group. Typical amines include m-xylylenediamine, m-phenylenediamine, p,p'-methylenedianiline, bis(p-aminophenyl)sulfone, 1,2-diamino-cyclohexane, 1,4-diaminocyclohexane, bis(p-aminocyclohexyl)methane, 1,3-bis(aminomethyl)cyclohexane, bis(4-amino-b 3-methyl-cyclohexyl)methane, 2,2-bis(4-aminocyclohexyl)propane, 1,4-bis(aminomethyl)cyclohexane, isophoronediamine and amino-1-(4'-aminophenyl)-1,3,3-trimethylindane. m-Xylylenediamine, 1,2-diaminocyclohexane, bis(p-aminocyclohexyl)methane and 1,3-bis(aminomethyl)cyclohexane are particularly preferred.

In carrying out the preparation of the instant reaction products, it has been found advantageous to conduct the reaction in an excess of the amine reactant. The particular quantity of excess employed can vary from slightly above equimolecular proportions to a very considerable excess, i.e. a 100% molar excess. Obviously however, practical considerations will govern the amount of excess employed since, for example, the upper limit employed will be dictated by the balancing of costs of material against benefits derived. The reaction product is readily separated from the excess amine at the completion of the reaction by distilling off the remaining amine under reduced pressure.

The following equations typify the reactions:

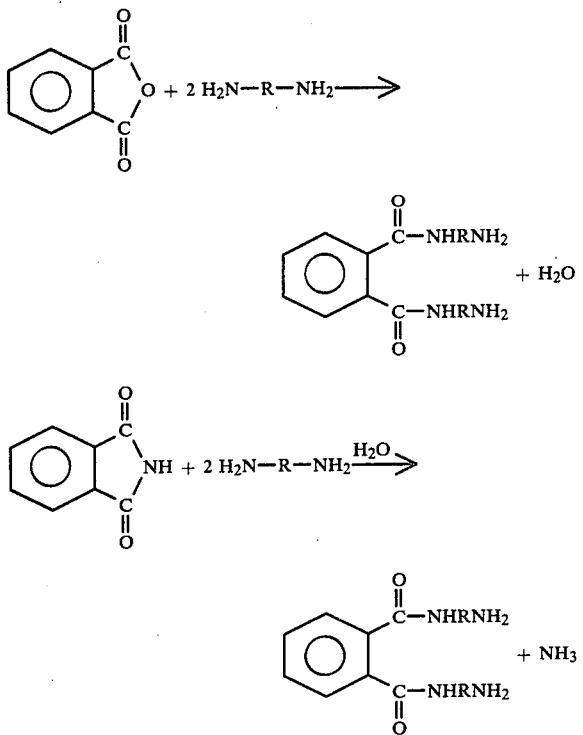

The reaction can best be conducted by following the general reaction procedure outlined in Spring and Woods, *J. Chem. Soc.*, 625–628 (1945). This is an aqueous procedure wherein temperatures of from about 20° C. to about 50° C. can be employed. For optimum results, however, the reactants are mixed at about 30° C. and maintained below about 50° C. during the reaction. The reaction is ordinarily carried out at atmospheric pressure. Reduced pressures can also be employed. It is also possible to utilize the procedure described in U.S. Pat. No. 3,639,657, although the hardeners prepared from certain polyamines tend to react too quickly with urethane resins. Accordingly, modification of the procedure by conducting the reaction in a dioxane solution, followed by extensive purification, allows for the use of this reaction procedure to prepare latent materials. The resulting products are generally glassy, low melting solids. Although products exhibiting di-amide substitution are preferred for purposes of this invention, product mixtures exhibiting both mono- and di-amide substitution are equally applicable.

The product of the reaction when incorporated into urethane resin compositions provides curable compositions which are stable for periods of at least one month at ambient conditions of temperature and pressure and which can thereafter be readily cured at temperatures of as low as about 100° C. These hardeners can be readily incorporated into urethane resin compositions by known mixing techniques familiar to practitioners skilled in the art.

The polyisocyanates which can be used in the curable polyurethane resin composition of the present invention include any of those commonly employed in making polyurethane plastics or resins such as toluene diisocyanate, 4,4-diphenylmethane diisocyanate, polyaryl polyisocyanates, and hexamethylene diisocyanate, or less conventional ones such as phenylindane diisocyanate. As is well known, resins made from such polyisocyanates are brittle so that for most purposes it is preferred to use the conventional polyisocyanate prepolymers having an average of more than a single isocyanate group per molecule, made by pre-reacting a molecular excess of a diisocyanate such as one of the foregoing with an organic material containing at least two hydroxyl groups per molecule and having a molecular weight of at least 300, such as castor oil, a hydroxy-terminated polyether, e.g., a polyalkylene glycol in which each alkylene group contains from 2 to 6 carbon atoms, a hydroxy-terminated polyester, particularly an aliphatic polyester of an alkylene glycol in which each alkylene contains 2 to 6 carbon atoms with an aliphatic polycarboxylic acid which contains in addition to the carboxyl group only hydrocarbon groups, the total number of carbon atoms in the acid being preferably from 3 to 10, or a hydroxy-terminated polybutadiene or butadiene-acrylonitrile copolymer. Polyethers such as polyethylene glycol, polypropylene glycol and polytetramethylene glycol having molecular weights from 300 to 2,000 and polyesters such as the hydroxy-containing polyesters of any of the polyalkylene glycols, preferably those having 2 to 6 carbon atoms, with polycarboxylic acids containing from 3 to 10 carbon atoms and containing only hydrocarbon groups in addition to carboxyl groups are also preferred. Such polyesters have an average equivalent weight (based on hydroxyl groups) of 150–1,000 and have 2 to 4 hydroxyl groups per molecule. Prepolymers are preferred which are made by reacting at least two molecular proportions of a diisocyanate as described above with a polyalkylene glycol as described above to form a prepolymer having an equivalent weight (based upon isocyanate groups) of 400–1,500, but other prepolymers having an equivalent weight (isocyanate) within the same range are also desirable.

In general, partial blocking of the polyisocyanate in those few cases where blocking is desired, whether it be a simple diisocyanate or a polyisocyanate prepolymer, can be achieved by heating it with a phenolic material at 80°–120° C. Preferably the polyisocyanate used for blocking is an aromatic polyisocyanate since the product produces a faster cure rate. Simple alkyl phenols in which the alkyl groups contains 2–12 carbon atoms such as nonylphenol and dinonyl phenol are effective and indeed are preferred for blocking purposes because no objectionable volatile by-products are liberated during the blocking reaction and because such blocked polyisocyanates are liquids. Polyphenols such as 4,4'-dihydroxydiphenyl methane, bisphenol A and phenolic novolacs can also be used for blocking but the blocked products are of very high viscosity. The amount of blocking agent employed need not be sufficient to react with all of the isocyanate groups in the polyisocyanate, in general from 0.4 to 1.0 equivalent weight of phenolic material for each isocyanate equivalent weight provides sufficient resistance to moisture, that is, at least 40% of the isocyanate groups are reacted with the blocking agent. It is not necessary to employ a solvent such as benzene for carrying out the blocking reaction, although such a solvent can be used; generally, it is preferred to omit any solvent. It is also preferred to avoid heating the polyisocyanate and phenolic material for excessively long times because this tends to reduce the rate of cure of the mixtures made with such products. As little as two hours heating at 100° C. is effective to produce substantial blocking and protection against moisture, while more than 18 hours tends to slow the cure time undesirably.

The amount of hardener present in the composition must be enough to provide amine hydrogen atoms (both primary and secondary) in an amount equal to at least 0.5 and at most about 1.0 of the amount stoichiometrically equivalent to the total isocyanate groups (including blocked isocyanate groups) present in the composition.

The products of this invention are useful as curing agents for a wide variety of urethane resins in various heat cured applications. When combined with polyurethanes at the indicated stoichiometric amounts, and cured at elevated temperatures, a network of high crosslink density occurs. Accordingly, the expression "cure" as used herein, denotes the conversion of the above hardener and urethane material into insoluble and infusible crosslinked products, with simultaneous shaping to give shaped articles such as castings, pressings or laminates, or to give two-dimensional structures such as coatings, enamels or adhesive bonds. Such systems have frequently been used within the telecommunications industry and for various molding and tooling applications.

The latent hardeners admixed with the polyurethane resins can furthermore be mixed, at any stage before cure, with usual modifiers such as extenders, fillers and reinforcing agents, pigments, dyestuffs, organic solvents, plasticizers, tackifiers, rubbers, accelerators, flow control agents, diluents, fungicides, anti-oxidants and the like. Typical urethane extenders include mineral oils, while typical plasticizers include phthalates, adipates, glutarates, fumarates, sebacates, and the like.

The following examples will further illustrate the embodiments of the instant invention. In these examples, all parts given are by weight otherwise noted.

EXAMPLE 1

This example illustrates the preparation of a typical latent hardener system of this invention.

A 20%, by weight, dioxane solution of phthalic anhydride was added dropwise to a refluxing (105°–125° C.) solution of m-xylylenediamine in dioxane solution (under nitrogen) in a ratio of one mole of anhydride to 4 moles of the amine. Addition was completed in about 80 minutes and the mixture was heated for a total of two hours at 110°–120° C. The water of reaction and dioxane solvent were stripped under vacuum to yield a viscous liquid. The liquid was triturated with successive portions of hot heptane, hot toluene, hexane and ethyl ether to produce solid material in about 70% yield. Analysis was conducted by thin layer chromatography (TLC), infrared and nuclear magnetic resonance (NMR) spectroscopy, amine titration, elemental analysis and electrical conductivity. Table I shows some of these results.

TABLE I

|   | Theory | Found |
|---|--------|-------|
| C | 71.6%  | 69.9% |
| H | 6.51%  | 6.53% |
| N | 13.9%  | 14.1% |
| Total amine | 4.97 eq./kg | 5.01% eq/kg |

The m-xylylenediamine phthalamide product appeared to be free of unreacted amine, imide and other impurities and had a melting point of 124°–127° C. Elemental analysis, NMR and IR spectroscopy supported the assignment of the 2:1 amine:anhydride amide structure. No electrical conductivity was observed in DMSO or in formamide, indicating the absence of ionic salt (e.g., amine carboxylate).

EXAMPLE 2

Bis(p-aminocyclohexyl)methane phthalamide was prepared by the aqueous reaction of bis(p-aminocyclohexyl)methane with phthalimide, according to a procedure similar to that published by Spring and Woods noted hereinabove. Thus, an emulsion of the amine in water was made using vigorous stirring. Phthalimide (1.0 mole per 2.4 moles of amine) was finely grounded and added to the emulsion at room temperature within a 10-minute period. The mixture was stirred for an additional 40 minutes and poured into a separatory funnel and extracted with chloroform. The chloroform solution was dried over magnesium sulfate, filtered and stripped. The product was washed with hexane and with anhydrous ethyl ether and then stripped in a vacuum oven.

A glassy, low melting (75°–90° C.) material was isolated in 28% yield. Infrared analysis showed a strong amide absorption. NMR analysis was consistent with the structure of a 2:1 amine-phthalimide reaction product.

EXAMPLE 3

The procedure of Example 2 was repeated using 1,3-bis(aminomethyl)cyclohexane as the amine component. A glassy product having a melting point of 54°–66° C. was obtained. IR and NMR analyses supported the 2:1 amine:phthalimide structure.

EXAMPLE 4

The procedure of Example 2 was repeated using 1,2-diaminocyclohexane as the amine component. A light tan, water soluble solid melting at 68°–75° C. was obtained. IR and NMR analyses supported the 2:1 amine:phthalimide structure.

A comparable product was also obtained by reacting two moles of the amine with one mole of phthalic anhydride for 45 minutes at a temperature of 125° C. in the absence of solvent.

EXAMPLE 5

This example illustrates the preparation of typical cured polyurethane systems of the instant invention as well as the excellent performance characteristics thereof.

The polyisocyanate prepolymer utilized herein is commercially available under the trade name Adiprene L-167 (DuPont) and is made by reacting one mol of polytetramethylene glycol (mol wt. 1000) with at least two mols of toluene diisocyanate. The prepolymer, which has a viscosity of 12,000 cps. at 25° C. contains 6.3% by weight of isocyanate groups and has an isocyanate equivalent weight of approximately 670. A second polyisocyanate prepolymer utilized herein is prepared from similar glycol and diisocyanate and is commercially available under the trade name Adiprene L-100 (DuPont). This prepolymer contains 4.1% by weight of isocyanate groups.

Each of these prepolymers was hand blended with the hardeners prepared in Examples 1–4 at concentrations noted in the following table. The formulations with L-167 were opaque, viscous fluids, while the formulations with L-100 were heterogeneous pastes. Portions of each mix were stored at ambient conditions (23° C.) and observed for their latency. Each of the blends remained in its original condition, i.e. was latent, for a period of at least four weeks.

The remainder of each composition was cured in an oven at 125° C. for two hours, followed by heating at 150° C. for two hours. The cured, solid materials were then kept at 71° C. and 95% relative humidity to evaluate their resistance to deterioration under these hot, moist conditions. The results of this test are noted in the following table.

| Components | Hardener Conc. (parts) | % of Stoichiometric Amount | Appearance After Cure | Appearance After Hot/Wet Aging |
|---|---|---|---|---|
| Ex. 1/L-167 | 28.5 | 95 | Soft weak rubber | — |
| Ex. 1/L-167 | 17.9 | 59 | Tough rubber | No change, minimal H$_2$O pickup (1.6%) |
| Ex. 2/L-167 | 24.4 | 59 | Tough rubber | No change, minimal H$_2$O pickup (1.6%) |
| Ex. 4/L-167 | 15.9 | 59 | Tough rubber | No change, minimal H$_2$O pickup (1.5%) |
| Ex. 1/L-100 | 18.7 | 95 | Tough rubber | — |

The results in this table as well as the results noted in the discussion hereinabove clearly indicate the latency and heat and moisture resistance of the urethane resin systems of this invention.

Similar systems can be prepared utilizing other standard urethane resins as itemized hereinabove.

In summary, this invention provides novel latent, curable urethane resin systems which exhibit excellent performance characteristics. Variations may be made in procedures, proportions and materials without departing from the scope of the invention as defined by the following claims.

What is claimed is:

1. A curable polyurethane resin composition comprising a polyisocyanate and as a curing agent therefor the product resulting from the reaction of an aliphatic, cycloaliphatic or aromatic anhydride or imide with an unsubstituted or lower alkyl-substituted aromatic, araliphatic or cycloaliphatic polyamine.

2. The composition of claim 1, wherein the amount of curing agent is sufficient to provide a primary and secondary amino hydrogen atoms in an amount equal to a least 0.5 of the amount stoichiometrically equivalent to the total isocyanate groups.

3. The composition of claim 1, wherein said anhydride is selected from the group consisting of phthalic anhydride, hexahydrophthalic anhydride, tetrahydrophthalic anhydride, methyltetrahydrophthalic anhydride, dodecylsuccinic anhydride, maleic anhydride and succinic anhydride.

4. The composition of claim 3, wherein said anhydride is phthalic anhydride.

5. The composition of claim 1, wherein said imide is phthalimide.

6. The composition of claim 1, wherein said polyamine is selected from the group consisting of m-xylylenediamine, 1,2-diaminocyclohexane, 1,4-diaminocyclohexane, bis(p-aminocyclohexyl)methane, 1,3-bis(aminomethyl)cyclohexane, bis(4-amino-3-methyl-cyclohexyl)methane, 2,2-bis(4-aminocyclohexyl)propane, 1,4-bis(aminomethyl)cyclohexane, and isophoronediamine.

7. The composition of claim 6, wherein said polyamine is m-xylylenediamine, 1,2-diaminocyclohexane, bis(p-aminocyclohexyl)methane or 1,3-bis(aminomethyl)cyclohexane.

8. The composition of claim 7, wherein said polyamine is m-xylylenediamine.

9. The composition of claim 1, wherein said polyamine is selected from the group consisting of m-phenylenediamine, p-phenylenediamine, methylenedianiline, bis(p-aminophenyl)sulfone, and amino-1-(4'-aminophenyl)-1,3,3-trimethylindane.

10. The composition of claim 1, wherein said curing agent is the product resulting from the reaction of m-xylylenediamine and phthalic anhydride.

11. The composition of claim 1, wherein said polyisocyanate is a prepolymer of a hydroxyl-containing organic material with an excess of diisocyanate.

12. The composition of claim 11, wherein said polyisocyanate is a prepolymer of polytetramethylene glycol and toluene diisocyanate.

13. The product obtained by curing the compositions of claim 1, 10 or 12 at elevated temperature.

* * * * *